B. WIELAND.
Grain Drill.
No. 49,460.
Patented Aug. 15, 1865.
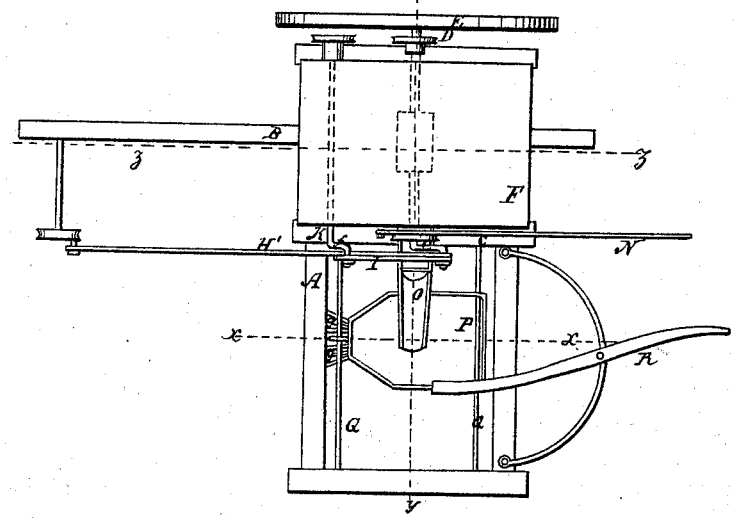
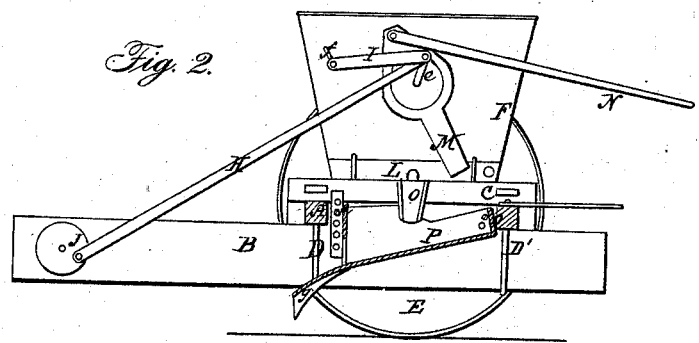
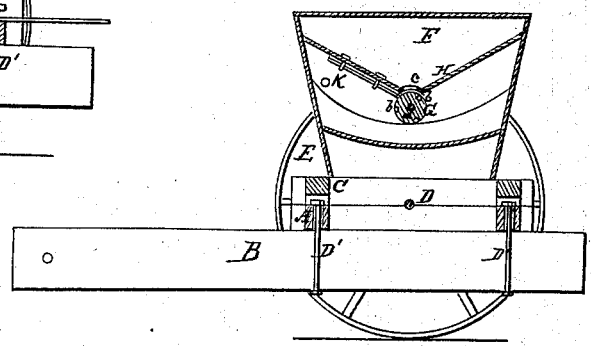
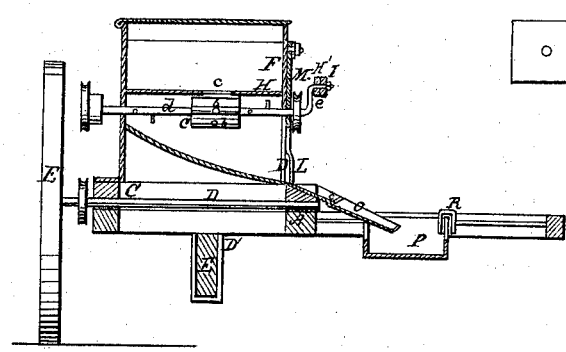
Witnesses:
C. L. Topliff
J. M. Carrington
Inventor:
B. Wieland
By Munn & Co.
Attys

UNITED STATES PATENT OFFICE.

BENJN. WIELAND, OF ORANGEVILLE, ILLINOIS.

IMPROVEMENT IN SEEDING-MACHINES.

Specification forming part of Letters Patent No. 49,460, dated August 15, 1865.

*To all whom it may concern:*

Be it known that I, BENJAMIN WIELAND, of Orangeville, in the county of Stephenson and State of Illinois, have invented a new and Improved Seeding-Machine; and I do hereby declare that the following is a full, clear, and exact description thereof, which will enable others skilled in the art to make and use the same, reference being had to the accompanying drawings, forming part of this specification.

This invention relates to a new and improved seeding-machine for sowing seed broadcast, and to be attached to any plow, so that the operations of plowing and sowing the seed may be simultaneously performed and a great economy effected in labor.

In the accompanying drawings, Figure 1, Sheet No. 1, is a plan or top view of my invention; Fig. 2, a vertical section of the same, taken in the line $xx$, Fig. 1; Fig. 3, Sheet No. 2, a vertical section of the same, taken in the line $yy$, Fig. 1; Fig. 4, a vertical section of the same, taken in the line $zz$, Fig. 1.

Similar letters of reference indicate like parts.

A represents a rectangular frame, which is affixed horizontally to a plow-beam, B, and C is a smaller frame on A, and connected to it by hinges or joints. The frame A is attached to the beam B by means of staples or clips D', so arranged as to admit of the frame being adjusted laterally, as may be required.

In the under side of the hinged frame C there is fitted a shaft, D, having a wheel, E, on its outer end, and on the frame C there is secured a hopper, F, in which the seed-distributing apparatus is placed. A cylinder or other device—such as agitators—may be used for this purpose. When a cylinder, G, is used it has its periphery provided with seed-cells $b$, and the cylinder works below an aperture, $c$, in a double-inclined partition-plate, H, in the hopper. This cylinder is driven by a band from the shaft D. If agitators be used, they may be attached to the shaft $d$ of the cylinder G, and a reciprocating or oscillating movement given the latter by means of a crank, $e$, at one end of the latter, which crank may be operated by means of a pitman, H' or I, the pitman H' being attached to the gage-wheel J of the plow-beam, and the pitman I attached to a crank, $f$, at one end of a shaft, K, which passes through the hopper and is operated by a belt from shaft D.

The bottom of the hopper F is inclined, and so formed as to conduct the seed to a slide-gate, L, at one side of the hopper, by adjusting which the capacity of the discharge-aperture may be regulated as desired, and the aperture may be entirely closed temporarily at any time by means of a pivoted gate, M, having a lever, N, attached to it. (See Fig. 2.)

The seed is conducted from the hopper by means of a spout, O, to an inclined receptacle, P, fitted on parallel rods Q Q in the frame A, and is provided with a discharge device composed of a convex plate divided into a series of fan-like troughs by radial ledges $g$. This receptacle P is vibrated by means of a lever, R.

Thus by this simple means seed may be sown during the plowing operation.

The object in having the hopper-frame C connected to the frame A by hinges is that the device may operate perfectly on uneven ground.

Having thus described my invention, I claim as new and desire to secure by Letters Patent—

The combination of the plow-beam B, hopper F, and inclined vibratory seed-receptacle P, when the parts are arranged with relation to each other and provided with the accessory appurtenances herein described and represented.

BENJAMIN WIELAND.

Witnesses:
 JACOB H. COOK,
 PETER SHECKLER.